United States Patent
Varekamp

(10) Patent No.: US 8,854,425 B2
(45) Date of Patent: Oct. 7, 2014

(54) METHOD AND APPARATUS FOR DEPTH-RELATED INFORMATION PROPAGATION

(75) Inventor: Christiaan Varekamp, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1038 days.

(21) Appl. No.: 12/669,828

(22) PCT Filed: Jul. 18, 2008

(86) PCT No.: PCT/IB2008/052896
§ 371 (c)(1),
(2), (4) Date: Jan. 20, 2010

(87) PCT Pub. No.: WO2009/013682
PCT Pub. Date: Jan. 29, 2009

(65) Prior Publication Data
US 2010/0194856 A1    Aug. 5, 2010

(30) Foreign Application Priority Data

Jul. 26, 2007  (EP) .................................... 07113245

(51) Int. Cl.
*H04N 13/00*      (2006.01)
*H04N 13/02*      (2006.01)
*G06T 5/00*       (2006.01)

(52) U.S. Cl.
CPC ............... *G06T 5/005* (2013.01); *H04N 13/022* (2013.01); *G06T 2207/10028* (2013.01); *H04N 13/026* (2013.01); *G06T 2207/10024* (2013.01); *G06T 2207/10016* (2013.01)
USPC ............................................. 348/42; 348/699

(58) Field of Classification Search
None
See application file for complete search history.

(56) References Cited

U.S. PATENT DOCUMENTS 7,039,110 B2   5/2006   Ernst et al.
7,110,453 B1   9/2006   Wilinski et al.
(Continued)

FOREIGN PATENT DOCUMENTS

JP    05346308 A    12/1993
JP    2004229093 A   8/2004
WO     0213141 A1    2/2002

OTHER PUBLICATIONS

Ansar et al., "Enhanced real-time stereo using bilateral filtering" 2nd International Symposium on 3D Data Processing, Visualization and Transmission, 2004. 3DPVT 2004. Proceedings., pp. 455-462., Sep. 2004.*
Harman et al, "Rapid 2D to 3D Conversion", Proceedings of the SPIE, SPIE, vol. 4660, Jan. 21, 2002, pp. 78-86.*

(Continued)

*Primary Examiner* — Mehrdad Dastouri
*Assistant Examiner* — James Anderson, III

(57) ABSTRACT

The present invention relates to an apparatus for and a method of propagating depth-related information from a first depth-map (810) associated with a first image (820) to a second depth-map (860) associated with a second image (830), the first and second image being temporally proximate images in an image sequence. The method comprises generating an intermediate depth-map (840) associated with the second image (830) by propagating depth values from the first depth-map (810) to the intermediate depth-map (840) using pixels of the first image (820) and the second image (830), and generating a motion vector (850) using information comprising depth values in a spatial region around a first location in the first depth-map (810) and depth values in a spatial region around a second location in the intermediate depth-map (840) and generating a depth value for the second location in the second depth-map (860) using information comprising the motion vector (850) and the first depth-map (810).

9 Claims, 6 Drawing Sheets

(56) References Cited

U.S. PATENT DOCUMENTS

| | | | |
|---|---|---|---|
| 8,000,392 B1* | 8/2011 | Krupiczka et al. | 375/240.16 |
| 2002/0048395 A1* | 4/2002 | Harman et al. | 382/154 |
| 2003/0091225 A1 | 5/2003 | Chen | |
| 2004/0095999 A1* | 5/2004 | Piehl et al. | 375/240.16 |

OTHER PUBLICATIONS

Harman et al: Rapid 2D to 3D Conversion; Proceedings of the SPIE, vol. 4660, pp. 78-86, 2002.

Tomasi et al: Bilateral Filtering for Gray and Color Images; Proceedings of the 1998 IEEE International Conference on Computer Vision, Bombay, India, 8 Page Document.

* cited by examiner depth ambiguity    new color

METHOD AND APPARATUS FOR DEPTH-RELATED INFORMATION PROPAGATION

FIELD OF THE INVENTION

The present invention relates to a method and apparatus for propagating depth-related information from a first depth-map associated with a first image to a second depth-map associated with a second image, the first and second image being temporally proximate images in an image sequence.

BACKGROUND OF THE INVENTION

Over the last few years various companies have been actively developing autostereoscopic displays suitable for rendering three-dimensional (3D) images. These devices can present viewers with a 3D impression without the need for special headgear and/or glasses.

Autostereoscopic displays generally generate different views for different viewing angles. In this manner a first image can be generated for the left eye and a second image for the right eye of a viewer. By displaying appropriate images, i.e. appropriate from the viewpoint of the left and right eye respectively, it is possible to display the respective images and convey a 3D impression to the viewer.

A variety of techniques can be used to generate images for such autostereoscopic displays. For example multi-view images can be recorded using multiple cameras wherein the position of the respective camera corresponds with the respective viewpoint of each respective view. Alternatively, individual images can be generated using a 3D computer model.

In order to maintain backwards compatibility and improve on bandwidth usage, many autostereoscopic displays use an input sequence in the form of a sequence of conventional 2D images and corresponding depth-maps.

Depth-maps provide depth information indicative of the absolute or relative distance of objects depicted in the image to the camera. By way of example, a common way of representing depth information is by means of an 8-bit grey-scale image. Depth-maps can provide depth-information on a per-pixel basis, but as will be clear to the skilled person may also use a coarser granularity, such as a lower resolution depth-map wherein each depth-map value provides depth-information for multiple pixels.

Disparity maps can be used as an alternative to the above mentioned depth-maps. Disparity refers to the apparent shift of objects in a scene when observed from two viewpoints, such as from the left-eye and the right-eye viewpoint. Disparity information and depth information are related and can be mapped onto one another as is commonly known to those skilled in the art.

In view of the above, the terms depth-related information and depth values are used throughout the description and are understood to comprise at least depth information as well as disparity information.

By providing an autostereoscopic display with an image sequence and a corresponding sequence of depth-related information maps, or depth-maps for short, the autostereoscopic display can render multiple views of the content for one or more viewers. Although newly created content might be provided with accurately recorded depth values, more conventional two-dimensional (2D) image sequences do not comprise the required depth values.

Various approaches to convert 2D to 3D content are known, some of which address real-time conversion without human intervention, whereas others address human-assisted 2D to 3D conversion. In the latter approach an operator generally defines depth information for selected key frames and this depth information is subsequently propagated to the non-key frames. Similar approaches may be used to propagate depth values when depth-values are available only for a subset of images in the image sequence.

A known approach is presented in International Patent Application WO2002/13141. According to this approach a network is trained using annotated depth values for a subset of pixels from a key-frame. This information is used to learn the relationship between texture information and depth characteristics. The trained network is subsequently used to generate depth information for the entire key-frames. During a second phase the depth-maps of the key-frames are used to generate depth-maps for non key-frames from image characteristics and relative distance to key frame(s).

SUMMARY OF THE INVENTION

A problem with the known approach is that it has difficulty handling objects with similar texture information located at different depths.

It is an object of the present invention to provide an alternative solution that aims to ameliorate this problem and propagate depth-related information from a first depth-map associated with a first image to a second depth-map associated with a second image, the first and second image being temporally proximate images in an image sequence.

This object is realized in that the method according to the present invention comprises generating an intermediate depth-map associated with the second image by propagating depth values from the first depth-map to the intermediate depth-map using pixels of the first image and the second image; generating a motion vector using information comprising depth values in a spatial region around a first location in the first depth-map and depth values in a spatial region around a second location in the intermediate depth-map; and generating a depth value for the second location in the second depth-map using information comprising the motion vector and the first depth-map.

The first and the second image represent images from an image sequence with a similar, yet different, timestamp. As a result, typically the first and second image will resemble one another but will differ as a result of changes in e.g. the camera viewpoint, camera settings, object motion, and/or object change.

Accordingly, the first and the second depth-map, associated with the first and second image respectively, also relate to different timestamps. The present invention aims to generate a depth-map for the second image using depth values from the first depth-map associated with the first image; hence the present invention propagates information from the first depth-map to the second depth-map.

It is known that during propagation of depth values of reliable depth-maps, such as manually annotated depth-maps of key-frames, the propagated depth-maps typically show small errors close to key-frames and more substantial errors further away from the key-frames.

It is an insight of the inventor that such propagation errors need to be corrected early on when the errors are still relatively small. As an added bonus, smaller errors allow usage of filters with smaller apertures. In order to correct propagation errors in an early stage the inventor proposes a multi-step approach. In a first step an intermediate depth-map is generated by propagating depth values from the first depth-map. The term propagate is used here to accentuate that the first depth-map relates to a different timestamp than the intermediate depth-map. The depth-values from the first depth-map can be propagated using a filter based on image characteristics, such as e.g. luminance, chrominance and/or texture, of both the first and the second image. The resulting intermediate depth-map can be interpreted as an initial estimate for the second depth-map.

Preferably the intermediate depth-map is generated using a bilateral filter. However, other approaches such as e.g. the use of machine-learning approaches can be used instead.

In a second step, a motion vector is established using information from a spatial region around a first location in the first depth-map and a spatial region around a second location in the intermediate depth-map. The motion vector is chosen such that the spatial region around the second location in the intermediate depth-map and the spatial region around the first location in the first depth-map show a relatively high correlation; i.e. high compared to other spatial regions in the first depth-map.

In a third step, the motion vector is used to generate a depth value for the second location in the second depth-map, using information comprising the motion vector and the first depth-map.

In the above manner, annotated depth values from a key-frame, or alternatively depth values that already have been propagated according to the present invention, can be propagated to further frames. The second step explicitly takes into account both the spatial context of the first location in the first depth-map and the spatial context of the second location in the second depth-map. By using depth values from the first depth map in a context that is indicated to be appropriate by the motion vector, object boundaries present in the first depth-map, in particular of objects of similar color and different depth, can be substantially preserved. In the above manner the present invention effectively ameliorates the problem of the prior art.

In one embodiment the depth value for the second location in the second depth-map is formed using the motion vector and depth values from the first depth-map only. In this case the motion vector is used to copy a depth value and/or region from the first depth-map to the second depth-map. The first and second locations correspond to the source and target of the motion vector. The advantage of the above embodiment is that by copying depth-values from the first depth-map to the second depth-map edge integrity of the first depth-map will be substantially preserved.

In a further embodiment the generation of the depth value for the second location in the second depth-map comprises selecting the depth value from a candidate set comprising: a depth value based on the motion vector and the first depth-map and a depth value based on a depth value at the second location in the intermediate depth-map. The advantage of the above approach is that if copying of depth values from the first depth map does not result in a satisfactory result, then the intermediate depth-map may be used as fallback. In a preferred variant of this embodiment, wherein the motion vector generation comprises the calculation of the Sum of Absolute Differences (SAD) for the motion vector, the SAD is used to select a depth value from the candidate set.

In a yet further embodiment the depth-values and/or regions of both the first and intermediate depth-map are combined, e.g. blended, to form a depth-value and/or block of the second depth-map. In this manner a more continuous transition between depth values can be obtained. This embodiment is particularly effective when a reliability measure is used to weight the contribution from the intermediate depth-map, i.e. the initial estimate of the second depth-map.

In one embodiment of the present invention the intermediate depth-map generation comprises the calculation of a depth value in the intermediate depth-map by means of a weighted addition of depth values from the first depth-map, using weight factors based on at least one pixel of the first image and at least one pixel of the second image, both pixels in spatial proximity of the respective depth-related information being propagated.

In a preferred embodiment of the above embodiment the weight factors are determined based on a non-linear function of the difference between the at least one pixel from the first image and the at least one pixel from the second image. In this manner the influence of pixels that show substantial differences in the resulting depth-values can be suppressed.

The object of the present invention is further realized by means of a depth-map propagation apparatus for propagating depth-related information from a first depth-map associated with a first image to a second depth-map associated with a second image, the first and second image being temporally proximate images in an image sequence, the apparatus comprising: first generation means arranged to generate an intermediate depth-map associated with the second image by propagating depth values from the first depth-map to the intermediate depth-map using pixels of the first image and the second image; a second generation means arranged to generate a motion vector using information comprising depth values in a spatial region around a first location in the first depth-map and depth values in a spatial region around a second location in the intermediate depth-map; and a third generation means arranged to generate a depth value for the second location in the second depth-map using information comprising the motion vector and the first depth-map.

BRIEF DESCRIPTION OF THE DRAWINGS

These and other advantageous aspects of the invention will be described in more detail using the following Figures.

The Figures are not drawn to scale. Generally, identical components are denoted by the same reference numerals in the Figures.

DETAILED DESCRIPTION OF EMBODIMENTS

Figure 1:
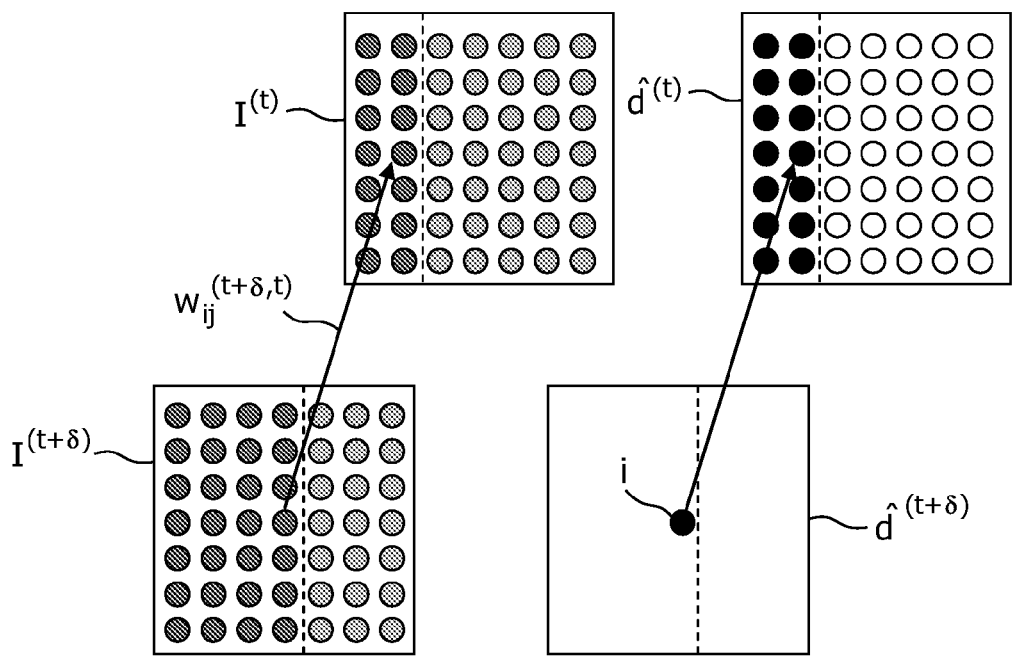
FIG. 1 shows a method of depth propagation using a bilateral filter.

When performing a semi-automated 2D to 3D content conversion, i.e. content conversion that is human-assisted, the conversion process may be influenced by errors produced by automated extrapolation routines that are used to propagate depth values to non key-frames. One method applied by the present inventor to automate propagation of depth values to non key-frames uses bilateral filtering. Bilateral filters were originally developed for edge-preserving smoothing of images as disclosed in "Bilateral filtering for Gray and Color Images" by C. Tomasi et al, published in Proceedings of the International Conference on Computer Vision, 1998, hereby incorporated by reference.

The inventor has found that bilateral filters are very effective for propagating depth values from a key-frame to further images in an image sequence. In order to propagate depth related information, the bilateral filter is applied recursively to subsequent image pairs. For the above reason, bilateral filters are preferably used for generating an intermediate depth map based on a first depth map D1 associated with a first image I1.

Bilateral filtering combines domain filtering with range filtering. Experiments have shown that bilateral filtering is a very effective method for propagating the depth from a key-frame to further frames in an image sequence. This process of depth propagation can be applied in a recursive manner. For each recursive step, the depth is propagated from a first image to a second image using the relation:

$$\hat{d}_i^{(t+\delta)} = \frac{\sum_j f_{ij} w_{ij}^{(t+\delta,t)} \hat{d}_j^{(t)}}{\sum_j f_{ij} w_{ij}^{(t+\delta,t)}} \quad (1)$$

Below, a single iteration of the bilateral filter is examined wherein depth values from a first depth-map are propagated to an intermediate depth-map. Here $\hat{d}_i^{(t+\delta)}$ is the depth value at pixel i in the intermediate depth-map, at time t+δ and $\hat{d}_j^{(t)}$ is the depth value in the first depth-map at spatial neighbor pixel j.

It will be clear to the skilled person that a bilateral filter can be used for forward propagation, i.e. forward in time (δ>0). However, bilateral filters can also be used for backward propagation (δ<0). Moreover, although typically bilateral filtering will be used for propagating depth from adjacent images in a recursive manner (δ=−1 or δ=1) it is also possible to use a larger step-size (δ<−1 or δ>1). When a bilateral filter is used in combination with the present invention, the bilateral filter is preferably used to propagate depth values from adjacent images. In this manner the amount of differences between the first and the second image is kept to a minimum, thereby increasing the probability that the intermediate depth-map can be corrected.

Initially, at the key-frame (t=0), it is assumed that the depth values are known to be without error. Pixel j comes from a temporal neighborhood centered on location i. The function $f_{ij}$ weights spatial neighbors according to their spatial distance. Here we use a box filter of size Δ:

$$f_{ij} = \begin{cases} 1 & \text{if } |x_i - x_j| \leq \frac{\Delta-1}{2}, |y_i - y_j| \leq \frac{\Delta-1}{2} \\ 0 & \text{otherwise.} \end{cases} \quad (2)$$

For instance, if a window size Δ of 19 pixels is used, then a maximum motion of 9 pixels can be tracked per iteration. The weights $w_{ij}^{(t+\delta,t)}$ depend on the color difference between pixel i in the second image at timestamp t+δ and neighbor pixels j in frame t. The weights used are given by:

$$w_{ij}^{(t+\delta,t)} = 2^{-\alpha(|r_i^{(t+\delta)} - r_j^{(t)}| + |g_i^{(t+\delta)} - g_j^{(t)}| + |b_i^{(t+\delta)} - b_j^{(t)}|)} \quad (3)$$

where α is a constant that determines the color importance. The influence of color increases with an increase of α. FIG. 1 illustrates the operation of the bilateral depth propagation filter for an example filter window size of Δ=7. FIG. 1 shows a first image $I^{(t)}$ and a second image $I^{(t+\delta)}$ of an image sequence. The first and the second image represent different images from the image sequence in temporal proximity, signified by the superscript (t+δ). The light pixels visible in the first image represent red pixels of a red object on a darker blue background. In the second image I2, indicated by $I^{(t+\delta)}$, dark blue background pixels are uncovered as the object has moved to the right.

To calculate the new depth value i of the intermediate depth map, indicated by $\hat{d}_i^{(t+\delta)}$, weights $w_{ij}^{(t+\delta,t)}$ are calculated for all pixels j in the filter footprint of frame t. A weighted average is used to predict the depth value at pixel i of frame t+δ. As the color differences are small for the dark blue pixels, but large for the light red pixels, the weights of the depth values of the dark blue pixels will be higher than those of the light red pixels. Consequently the depth value in the intermediate depth-map will be substantially determined by that of the dark blue pixels.

The bilateral filter implicitly assumes that a similar color implies similar depth values. In practice however, this color constancy assumption is often violated, resulting in errors in the propagated depth values. Once errors are introduced in the depth map they are recursively propagated to new frames.

Figure 2:
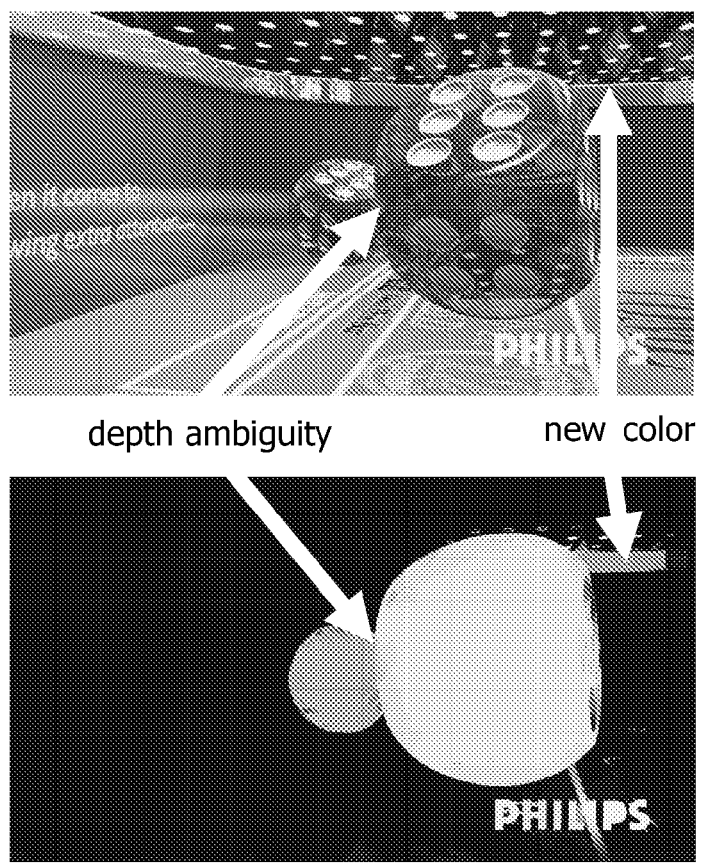
FIG. 2 shows an example of a computer-generated image and a depth-map that is propagated using a bilateral filter.

FIG. 2 illustrates the effect of such propagation errors in a depth map that was propagated over 30 images using a bilateral filter based on equation 1. To generate the results in FIG. 2, a bilateral filter with a footprint size of Δ=19 was used. The color importance parameter α was set to 0.125.

In this image the following problems can be observed:
1. 'Depth ambiguity'-problem
   Depth ambiguity effectively relates to the situation where a single color occurs in one and the same image at different depth values. In case of a bilateral filter this results in errors in the depth map that propagate and accumulate over time.
2. 'New color'-problem
   The new color problem is the result of the fact that the second image for which an initial depth-map estimate is being generated, comprises a color that was not present in the original key-frame image. As a result there is no information as to what kind of depth value should be associated with this color. This situation e.g. occurs if a new part of the background is being uncovered, if the edge of an out-of-focus foreground object blends with a new background color in the second image or if transparency is present in the image.

In FIG. 2 the 'depth ambiguity' problem is visible where the two dice meet in the picture. The color of the two dice is the same but the depth values of the foreground and background dice differ. As a result, after propagation, the depth value for this boundary is an average of the respective depth values. The 'new color' problem is visible on the right of the picture, where part of the background is being uncovered, resulting in an incorrect depth value.

Figure 3:
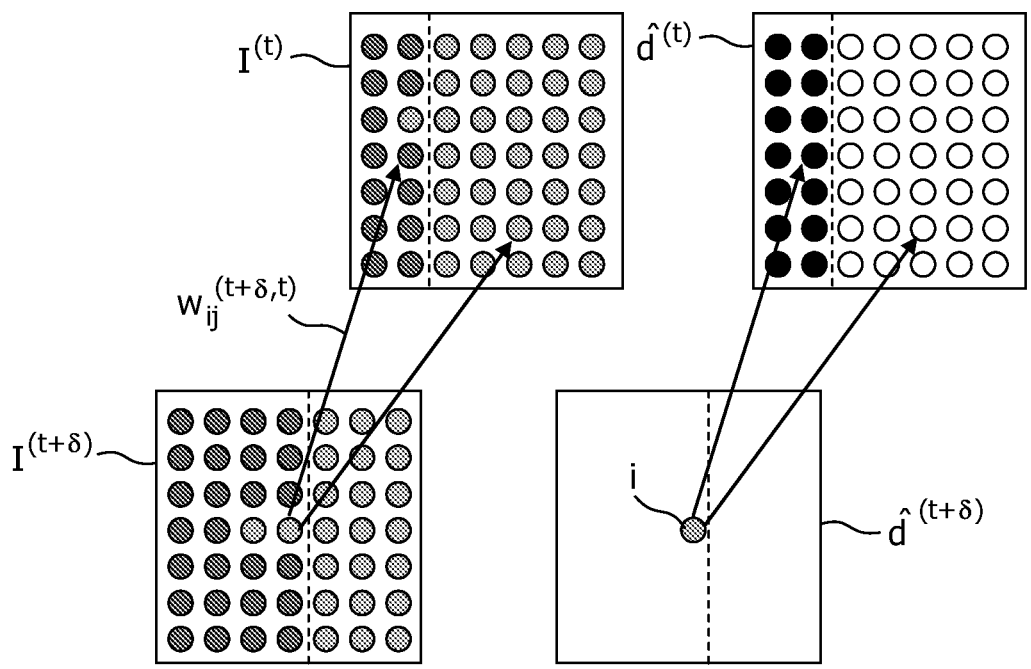
FIG. 3 shows the depth ambiguity problem addressed by the present invention.

FIG. 3 illustrates the depth ambiguity problem in more detail. The light red pixels that are the dominant color in the foreground in the first image $I^{(t)}$ also occur in the background. Consequently, when a depth value is propagated using bilateral filtering based on the first image $I^{(t)}$ and the second image $I^{(t+\delta)}$, averaging of the depth values from the first depth map $\hat{d}_j^{(t)}$ will occur, resulting in an erroneous depth value in the intermediate depth map $\hat{d}_i^{(t+\delta)}$.

Figure 4:
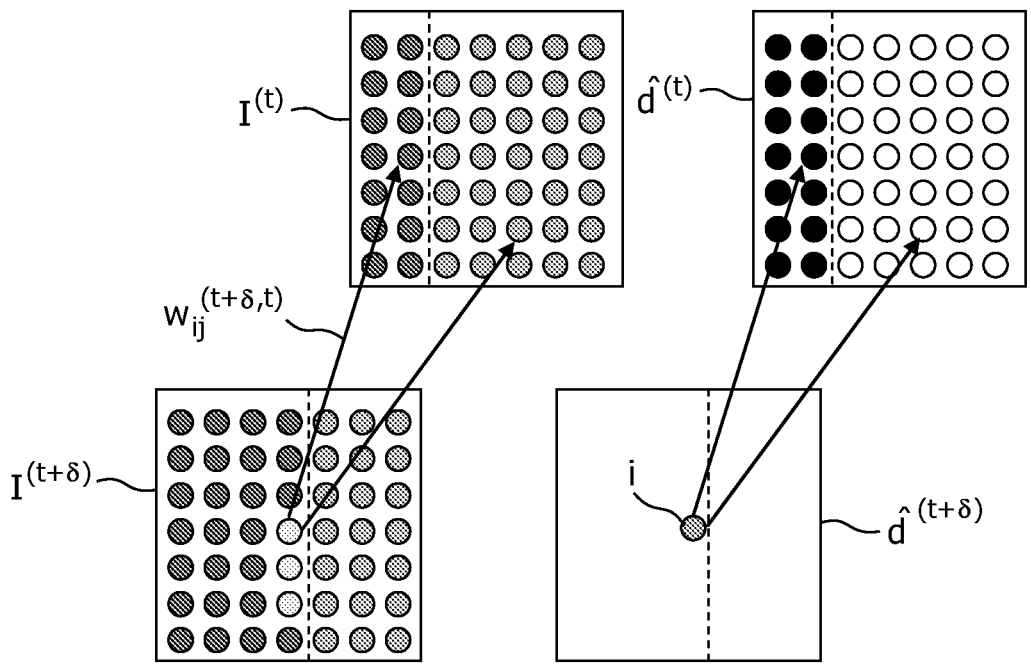
FIG. 4 shows the new color problem addressed by the present invention.

FIG. 4 illustrates the new color problem in more detail. A new color appears in the second image $I^{(t+\delta)}$: as the light red object in the foreground moves to the right several pixels of a very light yellow color become visible in the background. As yellow does not appear in the filter window of the first image $I^{(t)}$, the relation between color and depth cannot be accurately copied and an erroneous depth will result.

Although the above example explicitly proposes to use bilinear filtering for generating an intermediate depth-map for use in the present invention, the problems signaled above typically occur in other approaches that use image characteristics to infer depth-values. Image characteristics strictly speaking are not directly linked to the actual depth-values, and objects at different depths can in fact have similar colors, textures and/or luminance. Consequently, ambiguity will also affect other propagation approaches that use such image characteristics.

It is a goal of the present invention to at least ameliorate the ambiguity problem. Depth errors in the intermediate depth-map typically start as a few pixels but tend to cover larger regions further away from the key-frame. The present invention proposes to correct propagation errors directly after they occur, in a manner which aims to prevent them from propagating further.

Figure 5:
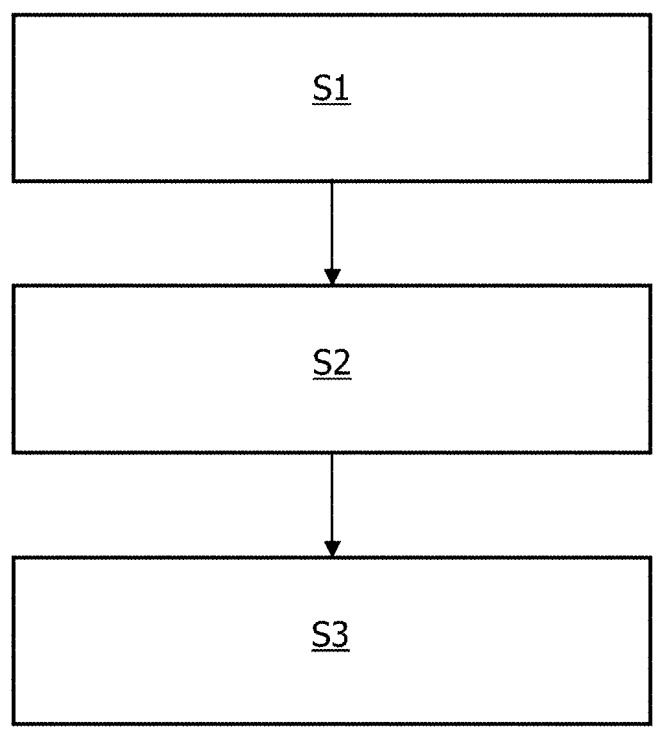
FIG. 5 shows a flow-chart of a method according to the present invention.

FIG. 5 shows a flow-chart of a method according to the present invention of propagating depth-related information from a first depth-map associated with a first image to a second depth-map associated with a second image, the first and second image being temporally proximate images in an image sequence. The method comprises three steps indicated in FIG. 5, as S1, S2, and S3 respectively.

The first step S1 shown in FIG. 5 comprises the generation of an intermediate depth-map associated with the second image by propagating depth values from the first depth-map to the intermediate depth-map, using image characteristics of the first image and the second image. In practice these image characteristics can be e.g. chrominance, luminance, and/or texture. Step S1 can be implemented using a bilateral filter as discussed above. However, the present invention is not limited thereto. Alternative approaches include, but are not restricted to, e.g. machine learning approaches that use image characteristics to propagate depth values.

In order to generate a depth value for a second location in the second depth map associated with the second image, a motion vector is generated in the second step S2 using the first depth-map and the intermediate depth-map. This motion vector identifies a spatial region around a first location in the first depth-map that shows a relatively high correlation with a spatial region around the second location in the second depth-map.

The second step S2 can be implemented in a variety of ways using motion estimation algorithms known to the skilled person. Which particular algorithm is used is immaterial as long as the algorithm takes the spatial context of the second location in the intermediate depth-map and the spatial context of the first location in the first depth-map into account. In this manner the motion vector identifies a spatial region in the first depth-map that resembles the spatial region in the second depth-map.

In the third step S3 the depth value for the second location in the second depth-map is generated using information comprising the motion vector and the first depth-map. Various alternative approaches can be used to generate this depth value without departing from the scope of the present invention.

In a first approach the third step S3 comprises copying of depth values from the first depth map using the motion vector generated in the second step S2. The ratio behind this approach is that as long as differences between respective images are relatively small, the changes between the corresponding depth-maps will also be small.

Thus, it is likely that there is a spatial region in the first depth-map that presents a more accurate representation of the spatial region around the second location than the spatial region at the second location in the intermediate depth-map. The motion vector generated in the second step S2 represents an indication of a spatial region in the first depth-map that provides a relatively good match with a spatial region of the second location in the intermediate depth-map.

In this first approach the motion vector is used to copy a depth value and/or an entire region from the first depth-map to the second depth-map. By copying a region from the first depth-map and/or by taking into account the spatial context of depth values, edges within the depth-map will be substantially preserved.

To further elucidate the implementation of the present invention, the implementation of the second step S2 in the form of block-based motion vector generation and the third step S3 in the form of copying spatial regions from the first depth-map to the second depth-map will be discussed next.

As indicated before, the intermediate depth-map $\hat{d}^{(t+\delta)}$ can be interpreted as a first estimate of the second depth-map. This estimate is subsequently corrected using the second step S2 and the third step S3. In order to correct this estimate it is assumed that depth errors in the intermediate depth-map $\hat{d}^{(t+\delta)}$ are spatially uncorrelated and that the depth values in the first depth-map $\hat{d}_{cor}^{(t)}$ are without error (in case the image corresponds to a key-frame) or have already been corrected (indicated by the subscript 'cor').

To correct the intermediate depth-map $\hat{d}_t^{(t+\delta)}$, pixels are grouped in k=1 ... N blocks $B_k$ of 16×16 pixels. Then, for each block $B_k$, the displacement vector $(u_x^{(k)}, u_y^{(k)})$ is determined that results in the smallest match error when block $B_k$ (from the intermediate depth map) is compared with a block in the first depth-map.

The depth values for the second depth map $\hat{d}_{cor}^{(t+\delta)}$ are subsequently obtained using:

$$\hat{d}_{cor}^{(t+\delta)}(x,y) = \hat{d}_{cor}^{(t)}(x+u_x^{(k)}, y+u_y^{(k)}) \qquad (4)$$

for all $(x, y) \in B_k$. This motion compensation operation corresponds to the copying of blocks of depth-values from the first depth-map to the second depth-map. The displacement vector is determined by minimization of a depth error function summed over all pixels in block $B_k$:

$$(u_x^{(k)}, u_y^{(k)}) = \underset{(v_x,v_y)}{\operatorname{argmin}} \sum_{(x,y) \in B_k} g(x, y, v_x, v_y), \qquad (5)$$

where the depth error function $g(x, y, v_x, v_y)$ is given by:

$$g = |\hat{d}^{(t+\delta)}(x,y) - \hat{d}_{cor}^{(t)}(x+v_x, y+v_y)|. \qquad (6)$$

Note that the depth error function is calculated between two signals with different statistical properties; $\hat{d}^{(t+\delta)}$ is the intermediate depth-map resulting from e.g. a bilateral filter and $\hat{d}_{cor}^{(t)}$ is the first depth-map, which is either an annotated depth-map or a previously corrected depth-map.

Although the above approach uses a motion estimation procedure that searches all positions in a local neighborhood, it is possible to obtain acceptable results using other search methods. Such optimizations and/or variations of motion estimation are well known to those skilled in the art.

Figure 6:
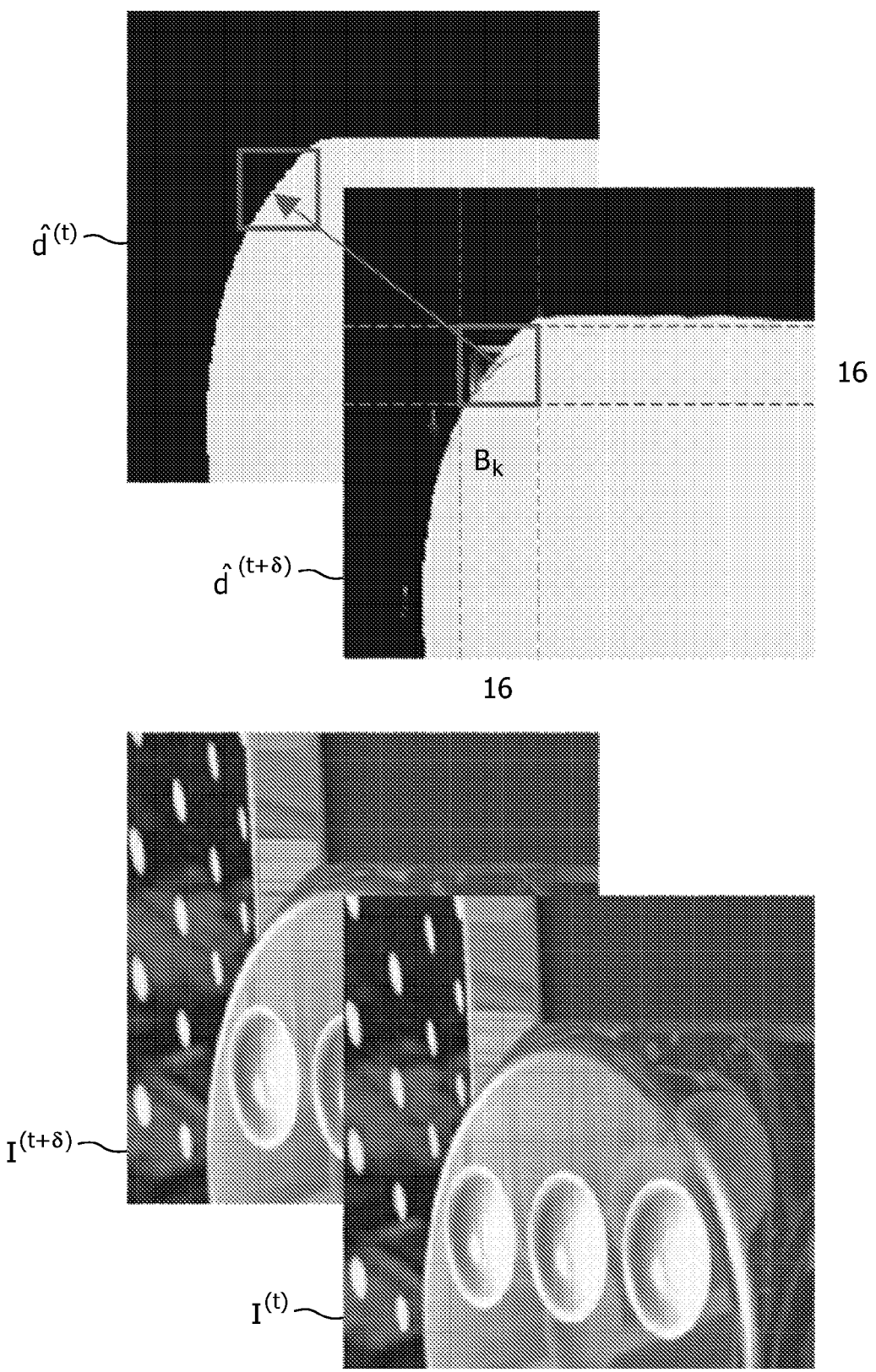
FIG. 6 shows an example of depth-map propagation according to the present invention.

FIG. 6 shows an example of a first image $I^{(t)}$, a second image $I^{(t+\delta)}$, a first depth-map $\hat{d}_{cor}^{(t)}$, and an intermediate depth-map $\hat{d}^{(t+\delta)}$. During the motion vector generation a block is identified within the first depth map $\hat{d}_{cor}^{(t)}$ at a first location that provides the best match with a block at a second location in the intermediate depth-map $\hat{d}^{(t+\delta)}$. Here the best match is the match that results in the smallest match error. Next, the block identified by the motion vector is copied to the second depth-map at the second location. This approach assures that shape information that is present in the first depth-map is substantially preserved in the propagated frames.

The above approach copies information corresponding to the best match from the first depth-map to the second depth-map regardless of the quality of the match. In an alternative embodiment a selection is made whether or not to propagate information from the first depth-map $\hat{d}_{cor}^{(t)}$ or information from the intermediate depth-map $\hat{d}^{(t+\delta)}$.

The decision as to which of these alternative depth values is to be propagated is preferably based on the match error. In case the match error is low, there is a substantial correlation between the spatial region surrounding the first location in the first depth-map $\hat{d}_{cor}^{(t)}$ and the spatial region surrounding the second location in the intermediate depth-map $\hat{d}^{(t+\delta)}$. In such a situation it is preferable to propagate the information from the first depth-map $\hat{d}_{cor}^{(t)}$. Alternatively, if the match error is large it is clear that there is a substantial possibility that the motion vector candidate may not be optimal. In this situation it is preferable to propagate the information from the intermediate depth-map $\hat{d}^{(t+\delta)}$.

More preferably a match error threshold is used to select between the above candidates. Subtle variations to the above approach are envisaged, such as the addition of further candidates, and/or further selection criteria.

A possible disadvantage of the above approach is that when different candidates are selected for adjacent blocks, this may result in discontinuities in the resulting second depth-map. In order to prevent such discontinuities, instead of selecting either one of the candidates it is also possible to blend the candidates. Preferably the blending of these candidates is controlled by means of a reliability measure such as the matching error. If the matching error is high then this is an indication that the reliability of the motion vector candidate is relatively low. As a result the weight of this candidate can be lowered when blending the candidates.

In order to further improve selection and/or blending of candidates, further reliability measures can be used such as a reliability measure indicative of the reliability of depth-values of the intermediate depth-map. In case a bilateral filter is used to generate the intermediate depth-map, such a reliability measure can be established by establishing the smallest color difference between pixels when calculating the filter weights. If all color differences between the pixels in the first image and the second image are large, i.e. all weights are small, there is a substantial possibility that the bilateral filter will not provide a reliable depth-value.

Although throughout the description the propagation of depth values is considered to occur forward in time, the present invention is not limited thereto. The present invention can be used to similar advantage in scenarios that apply bi-directional propagation, i.e. both forward and backward propagation. In a bi-directional propagation scenario two intermediate depth-maps can be estimated for each frame and two motion vectors can be generated. In a bi-directional approach the contribution of the backward and forward prediction is preferably weighted dependent on the distance to the corresponding key frames.

In order to use the present invention to maximum effect, the generation of the intermediate depth-map should preferably take differences between pixels in the first and second image into account but should refrain from imposing spatial constraints provided by the morphology of the first depth-map. In contrast, the step of generating the motion vector preferably takes into account the spatial constraints provided by the morphology of the region surrounding the pixel for which a depth value is being generated.

Figure 7:
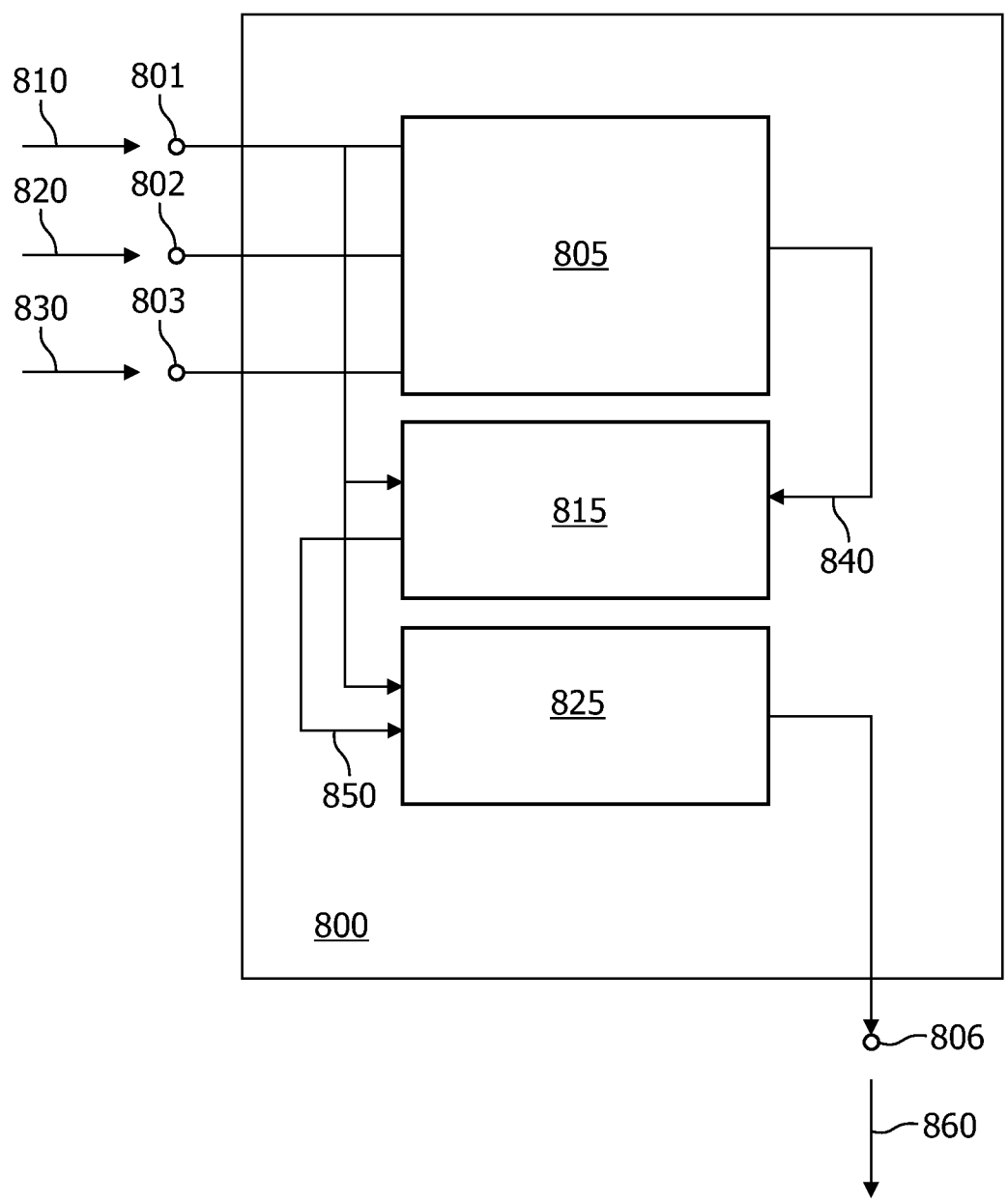
FIG. 7 shows a block diagram of a depth propagation apparatus according to the present invention.

FIG. 7 shows a basic depth-map propagation apparatus 800 for propagating depth-related information from a first depth-map 810 associated with a first image 820 to a second depth-map 860 associated with a second image 830 according to the present invention. The apparatus 800 receives three input signals: the first image 820, the first depth-map 810 and the second image 830 on the input connectors 802, 801, and 803, respectively. The apparatus outputs one output signal, the second depth map 860 on output connector 806.

In a variant of the apparatus 800, a single aggregate input signal in the form of an image sequence with annotated keyframes is input on a single connector instead of on three input connectors 801, 802, and 803. Likewise a single aggregate output signal could be provided in the form of an image sequence with depth-maps propagated according to the present invention.

The apparatus 800 further comprises a first generation means 805 arranged to generate an intermediate depth-map 840 associated with the second image 830. As discussed above the generation of the intermediate depth-map 840 can be implemented in various manners by propagating depth values from the first depth-map 810 to the intermediate depth-map 840 using pixels of the first image 820 and the second image 830.

The apparatus also comprises a second generation means 815 arranged to generate a motion vector 850 using information comprising depth values in a spatial region around a first location in the first depth-map and depth values in a spatial region around a second location in the intermediate depth-map.

This motion vector 850 is subsequently used by a third generation means 825 that is arranged to generate a depth value for the second location in the second depth-map 860 using information comprising the motion vector 850 and the first depth-map 810.

It will be clear to the skilled person that alternative implementations of the apparatus 800 can be envisaged without departing from the scope of the present invention. As all of the generation means described above perform processing tasks, the tasks performed by the first, second and third generation means 805, 815, 825 could be mapped onto a single digital signal processor.

Although the above explicitly mentions a digital signal processor, the present invention is not limited thereto. Alternative processing platforms could be used that provide similar functionality as the digital signal processor mentioned above. These processing platforms need not be programmable processing platforms but could likewise consist of a dedicated Application Specific Integrated Circuit (ASIC). In fact the processing tasks may be divided over various modules in a hybrid hardware/software system without departing from the scope of the present invention.

Figure 8:
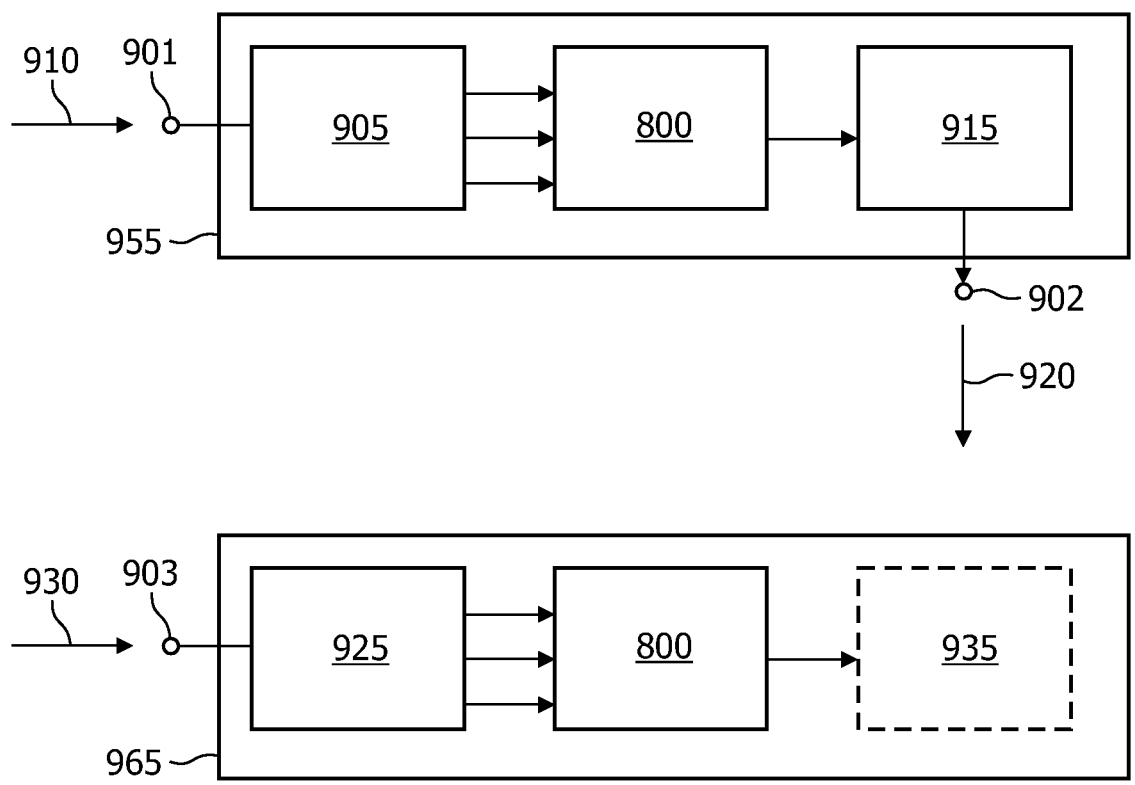
FIG. 8 shows a block diagram of both a consumer electronics device and a content conversion device according to the present invention.

FIG. 8 shows a content conversion device 955 and a consumer electronics device 965 that each comprise an apparatus 800 described above. The content conversion device comprises an input preparation means 905 that receives an input signal in the form of an image sequence 910 over input connector 901. The image sequence 910 provides the first and second image used by the apparatus 800. The input preparation means 905 enables human assisted shot-cut detection and annotation of key-frames. Subsequently the present invention can be used to propagate depth values to non key-frames. In addition, the content conversion device 955 further comprises an output preparation means 915 that allows e.g. format selection for the output signal 920 comprising the propagated depth-maps for output over the output connector 902.

The consumer electronics device 965 comprises an input connector 903 for receiving an input signal 930 comprising an image sequence and depth-information for selecting key-frames in the image sequence. The input preparation means 925 prepares the images for processing by the apparatus 800. In operation the apparatus 800 effectively propagates the depth-information from key-frames to non-key frames. Consequently, not every image in the input signal 930 requires a depth-map and in this manner the present invention also enables data compression of the transmission signal.

Optionally, the consumer electronics device 965 may comprise an autostereoscopic display means 935 for displaying the resulting image sequence with accompanying depth maps.

Throughout the description, the generation of the intermediate depth-map is presented as a single processing step, however it will be clear to the skilled person that the generation of the intermediate depth-map is not limited thereto. In fact it is much more likely that the generation of the intermediate depth-map comprises several steps, including e.g. post-processing steps that e.g. may provide noise suppression.

Throughout the description the term image sequence is used for an image sequence comprising some form of continuity. It will be clear to the skilled person that propagation of depth values only makes sense in a situation where such continuity is present. In order to obtain a substantially continuous image sequence, an image sequence can be offered to a shot-cut detector, or can be manually processed, to isolate substantially continuous image sequences.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

It will be clear that within the framework of the invention many variations are possible. It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope.

Use of the verb "to comprise" and its conjugations does not exclude the presence of elements other than those stated in the claims. Use of the article "a" or "an" preceding an element does not exclude the presence of a plurality of such elements.

The invention claimed is:

1. A method, operable in a processor, said method propagating depth-related information from a first depth-map associated with a first image to a second depth-map associated with a second image, the first and second image being temporally proximate images in an image sequence, the method comprising:
   generating an intermediate depth-map associated with the second image by propagating depth values from the first depth-map to the intermediate depth-map using pixels of the first image and the second image, wherein generating the intermediate depth-map comprises:
      calculation of a depth value in the intermediate depth-map by means of a weighted addition of depth values from the first depth-map using weight factors determined based on a non-linear function of a difference between at least one pixel from the first image and at least one corresponding pixel from the second image, both pixels in spatial proximity of the respective depth-related information being propagated;
   generating a reliability measure (R) for a depth value in the intermediate depth-map,
   generating a motion vector using information comprising depth values in a spatial region around a first location in the first depth-map and depth values in a spatial region around a second location in the intermediate depth-map, said spatial region around the second location having a high correlation with the spatial region around the first location; and
   generating a depth value for the second location in the second depth-map using information comprising the motion vector, and the reliability measure, wherein said reliability measure determines selection of one of: elements of the first depth map, elements of the intermediate depth map and a blend of elements of the first depth map and the second depth map.

2. The method of claim 1, wherein the generation of the depth value for the second location in the second depth-map comprises selecting the depth value from candidates comprising:
   a depth value based on the motion vector and the first depth-map; and
   a depth value based on a depth value at the second location in the intermediate depth-map.

3. The method of claim 1, wherein the generation of the depth value for the second location in the second depth-map comprises a weighted addition of information comprising:
   a depth value based on the motion vector and the first depth-map; and
   a further depth value based on a depth value at the second location of the intermediate depth-map.

4. The method of claim 1, wherein the image sequence is a shot from a further image sequence.

5. A depth-map propagation apparatus for propagating depth-related information from a first depth-map associated with a first image to a second depth-map associated with a second image, the first and second image being temporally proximate images in an image sequence, the apparatus comprising:
   first generation means arranged to:
      generate an intermediate depth-map associated with the second image by propagating depth values from the first depth-map to the intermediate depth-map using pixels of the first image and the second image wherein generating the intermediate depth-map comprises:
      calculation of a depth value in the intermediate depth-map by means of a weighted addition of depth values from the first depth-map using weight factors determined based on a non-linear function of a difference between at least one pixel from the first image and at least one corresponding pixel from the second image, both pixels in spatial proximity of the respective depth-related information being propagated;
      generate a reliability measure (R) for a depth value in the intermediate depth-map;
   a second generation means arranged to generate a motion vector using information comprising depth values in a spatial region around a first location in the first depth-map and depth values in a spatial region around a second location in the intermediate depth-map, said spatial region around the second location having a high correlation with the spatial region around the first location; and third generation means arranged to generate a depth value for the second location in the second depth-map using information comprising the motion vector, and the reliability measure, wherein said reliability measure determines selection of one of: elements of the first depth map, elements of the intermediate depth map and a blend of elements of the first depth map and the second depth map.

6. A consumer electronics device comprising:
a depth-map propagation apparatus comprising:
  a processor:
    propagating depth-related information from a first depth-map associated with a first image to a second depth-map associated with a second image, the first and second image being temporally proximate images in an image sequence,
    generating an intermediate depth-map associated with the second image by propagating depth values from the first depth-map to the intermediate depth-map using pixels of the first image and the second image, wherein generating the intermediate depth-map comprises:
  calculation of a depth value in the intermediate depth-map by means of a weighted addition of depth values from the first depth-map using weight factors determined based on a non-linear function of a difference between at least one pixel from the first image and at least one corresponding pixel from the second image, both pixels in spatial proximity of the respective depth-related information being propagated;
  generating a reliability measure (R) for a depth value in the intermediate depth-map;
  generating a motion vector using information comprising depth values in a spatial region around a first location in the first depth-map and depth values in a spatial region around a second location in the intermediate depth-map, said spatial region around the second location having a high correlation with the spatial region around the first location; and
  generating a depth value for the second location in the second depth-map using information comprising the motion vector, and the reliability measure, wherein said reliability measure determines selection of one of: elements of the first depth map, elements of the intermediate depth map and a blend of elements of the first depth map and the second depth map.

7. A content conversion device comprising a depth-map propagation apparatus comprising:
a processor:
  propagating depth-related information from a first depth-map associated with a first image to a second depth-map associated with a second image, the first and second image being temporally proximate images in an image sequence,
  generating an intermediate depth-map associated with the second image by propagating depth values from the first depth-map to the intermediate depth-map using pixels of the first image and the second image wherein generating the intermediate depth-map comprises:
calculation of a depth value in the intermediate depth-map by means of a weighted addition of depth values from the first depth-map using weight factors determined based on a non-linear function of a difference between at least one pixel from the first image and at least one corresponding pixel from the second image, both pixels in spatial proximity of the respective depth-related information being propagated;
  generating a reliability measure (R) for a depth value in the intermediate depth-map;
  generating a motion vector using information comprising depth values in a spatial region around a first location in the first depth-map and depth values in a spatial region around a second location in the intermediate depth-map, said spatial region around the second location having a high correlation with the spatial region around the first location; and
  generating a depth value for the second location in the second depth-map using information comprising the motion vector, and the reliability measure, wherein said reliability measure determines selection of one of: elements of the first depth map, elements of the intermediate depth map and a blend of elements of the first depth map and the second depth map.

8. A computer program product stored on a non-transitory computer readable medium, said computer program product comprising instructions for causing a programmable device to execute the method comprising:
  generating an intermediate depth-map associated with the second image by propagating depth values from the first depth-map to the intermediate depth-map using pixels of the first image and the second image, wherein generating the intermediate depth-map comprises:
  calculation of a depth value in the intermediate depth-map by means of a weighted addition of depth values from the first depth-map using weight factors determined based on a non-linear function of a difference between at least one pixel from the first image and at least one corresponding pixel from the second image, both pixels in spatial proximity of the respective depth-related information being propagated;
  generating a reliability measure (R) for a depth value in the intermediate depth-map;
generating a motion vector using information comprising depth values in a spatial region around a first location in the first depth-map and depth values in a spatial region around a second location in the intermediate depth-map, said spatial region around the second location having a high correlation with the spatial region around the first location; and
generating a depth value for the second location in the second depth-map using information comprising the motion vector, and the reliability measure, wherein said reliability measure determines selection of one of: elements of the first depth map, elements of the intermediate depth map and a blend of elements of the first depth map and the second depth map.

9. A consumer electronic device comprising:
an input preparation device receiving an input signal comprising an image sequence and associated depth maps;
a processor:
  receiving said input signal;
  generating an intermediate depth-map associated with a second image of the image sequence by propagating depth values from a first depth-map to the intermediate depth-map using pixels of a first image of the image sequence and the second image, wherein generating the intermediate depth-map comprises:
calculation of a depth value in the intermediate depth-map by means of a weighted addition of depth values from the first depth-map using weight factors determined based on a non-linear function of a difference between at least one pixel from the first image and at least one corresponding pixel from the second image, both pixels in spatial proximity of the respective depth-related information being propagated;

generating a reliability measure (R) for a depth value in the intermediate depth-map;

generating a motion vector using information comprising depth values in a spatial region around a first location in the first depth-map and depth values in a spatial region around a second location in the intermediate depth-map, said spatial region around the second location having a high correlation with the spatial region around the first location; and generating a depth value for the second location in the second depth-map using information comprising the motion vector, and the reliability measure, wherein said reliability measure determines selection of one of: elements of the first depth map, elements of the intermediate depth map and a blend of elements of the first depth map and the second depth map; and a display displaying the image sequence and accompanying depth maps.

* * * * *